United States Patent [19]

Carlsson et al.

[11] 4,048,367

[45] Sept. 13, 1977

[54] PHOTOSTABILIZATION OF POLYMERS

[76] Inventors: David J. Carlsson, 14 Delong Drive, Ottawa 9, Ontario; Tony Suprunchuk, 2124 Haig Drive; David M. Wiles, 1927 Fairmeadow Crescent, both of Ottawa 8, Ontario, all of Canada

[21] Appl. No.: 554,990

[22] Filed: Mar. 3, 1975

Related U.S. Application Data

[63] Continuation-in-part of Ser. No. 267,461, June 29, 1972, Pat. No. 3,871,901.

[30] Foreign Application Priority Data

July 2, 1971  Canada .................................... 117203

[51] Int. Cl.² .......................... B05D 1/18; B05D 3/14; B32B 27/02; B32B 27/16
[52] U.S. Cl. .................................... 428/220; 427/40; 427/160; 428/336; 428/394; 428/395
[58] Field of Search ...................... 427/40, 160, 430 R; 260/48.95 B; 428/336, 337, 339, 394, 411, 523, 220, 395

[56] References Cited

U.S. PATENT DOCUMENTS

| | | | |
|---|---|---|---|
| 2,920,978 | 1/1960 | Randall | 427/160 |
| 2,976,259 | 3/1961 | Hardy et al. | 260/45.85 B |
| 3,043,709 | 7/1962 | Amborski | 428/336 |
| 3,112,338 | 11/1963 | Smutny | 260/45.85 B |
| 3,309,220 | 3/1967 | Osteen | 427/160 |
| 3,387,991 | 6/1968 | Erchak | 427/40 |
| 3,519,462 | 7/1970 | Bristol | 427/160 |
| 3,617,330 | 11/1971 | Peilstocker | 427/160 |
| 3,681,431 | 8/1972 | Dexter et al. | 260/45.85 B |
| 3,914,521 | 10/1975 | Beatty et al. | 427/40 |
| 3,935,163 | 1/1976 | Spivack | 260/45.85 B |

OTHER PUBLICATIONS

Modern Plastics Encyclopedia vol. 49: No. 10A Oct. 1972, pp. 435, 437, 438, 488, 489.
Encylopedia of Polymer Science & Technology, vol. 14, pp. 129-136, 1971.

*Primary Examiner*—James R. Hoffman
*Attorney, Agent, or Firm*—Mason, Fenwick & Lawrence

[57] ABSTRACT

Articles formed from polymers which are susceptible to degradative attack by ultraviolet radiation are stabilized by the application of a thin continuous layer of an energy transfer agent, which agent does not significantly absorb radiation in the ultraviolet region of the spectrum. The energy transfer agent is a substituted phenol, and the agent is used in amounts of at most 0.4%, by weight, based on the demonstrate prolonged resistance to ultraviolet degradation.

21 Claims, 1 Drawing Figure

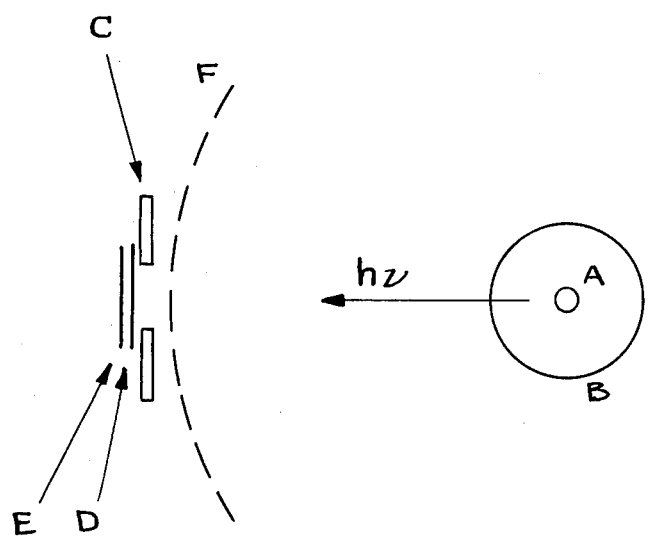

PHOTOSTABILIZATION OF POLYMERS

This application is a continuation-in-part of our application Ser. No. 267,461, filed June 29, 1972, now U.S. Pat. No. 3,871,901.

This invention relates to polymeric articles stabilised against the degradative effects of actinic radiation, particularly ultraviolet radiation, and to processes for their protection.

Most commercial polymers (including polyolefins, polyesters, polyamides, polystyrene, acrylate and alkyl acrylate polymers and polymers of other ethylenically unsaturated monomer and cellulosics) suffer from irreversible damage when exposed to actinic radiation. Thus, exposure to such radiation can cause fading, discolouration, changes in light transmission, and changes in mechanical properties. The most damaging radiation is that in the ultraviolet region of the electromagnetic spectrum. This region lies next to, and is of shorter wavelength than, the visible region. It is normally considered to occupy the range of wavelengths from about 50 A to about 4000 A. Ultraviolet radiation of wavelength about 3000 A to 4000 A (the "near region") is present in sunlight (the shorter wavelengths are cut out by the Earth's atmosphere). Other sources of such radiation are carbon arc and gas discharge lamps. The incidence of such radiation on polymeric articles can cause undesirable photochemical reactions, such as decompositions, rearrangements and oxidations, which result in the undesirable changes in physical properties referred to above. These changes are frequently caused by the presence of impurities since polymers, for example polyolefins, many vinyl polymers and polyamides, theoretically should not absorb ultraviolet radiation when pure. For example, in the case of polyolefins it is the impurities which are formed during processing, such as ketonic, aldehydic or peroxidic substances, which are the light sensitive species (chromophores). It is the absorption of light by these chromophores to give energetically excited species which leads to the onset of photo-induced degradation, since decomposition of the excited species causes chain scission and initiates oxidative attack.

Hitherto, polymeric materials have been protected against the degradative effects of ultraviolet light by the use of a wide variety of stabilisers. One class of stabilisers, the "absorbers," protect the polymer by screening the polymer from incident light of harmful wavelength. Such stabilisers are required to absorb strongly light in the ultraviolet region, especially the "near region." They preferably should also be transparent to light in the visible region, stable to light and heat, and compatible with the polymer and any compounding ingredients it may contain, for example, antioxidants.

Although compounds have been prepared for use as absorbers which satisfy these criteria, in general they have to be used in relatively high concentrations if they are to provide adequate protection. Increasing the concentration of an absorber may cause problems of compatibility with a substrate, and can detract from the properties, such as the colour, clarity and tensile properties, of a substrate. Furthermore, the absorbers usually are uniformly distributed throughout the substrate polymer and, as attenuation of the ultraviolet radiation increases exponentially as the distance from the surface increases, extensive surface deterioration is not prevented by the use of this type of stabiliser. Such a disadvantage is particularly noticeable in thin articles which have a high surface area in relation to their volume, so that thin articles, such as films or textile fibers, are at best only partially protected against degradation by ultraviolet radiation. For example, conventional absorbers have been found to offer little protection to polypropylene monofilaments of <50 microns diameter (Textile Research Journal 39 (1969), pages 243–247). It has, furthermore, been found that the actinic deterioration of polypropylene films is initiated by the photo-oxidation of surface impurities or chromophores, which gives rise to extensive surface deterioration and consequent loss of physical properties during ultraviolet irradiation (D. J. Carlsson and D. M. Wiles, Journal of Polymer Science, Polymer Letters 8B, page 419, 1970). The chromophores are present in a very thin layer (of the order of a few hundred Angstroms) on the surface of the film so that stabilisation of such thin extruded articles as films (less than 50λ in thickness) by the uniform distribution of ultraviolet absorbers is ineffective, except at impractically high concentrations.

Similar considerations apply to other polymeric substrates. In the case of polymers which inherently absorb a high proportion of radiation in the near ultraviolet region, such as aromatic polyamides, polycarbonates and aromatic polyesters, degradation takes place in only a thin surface layer since extinction of the incident radiation occurs in this layer. In addition, opaque, filled, pigmented or dyed polymers scatter and absorb incident radiation, and undergo degradation only in a surface layer.

One way out of this difficulty which has been suggested is the provision of a layer of the absorber between the polymeric substrate and the source of actinic radiation. However, this requires the application of a relatively thick layer if the absorber is to be effective since the layer is required to screen out all of the wavelengths to which the substrate is sensitive. This can be accomplished by incorporating the absorber in a polymer composition which is coated onto the substrate.

This solution to the problem is not entirely satisfactory, since few compounds are capable of providing a coating layer which is compatible with the substrate so that the coating does not tend to break away from the substrate.

Another class of stabilisers can provide protection against ultraviolet radiation. These are compounds which do not absorb a significant proportion of incident ultraviolet radiation and are known as "energy transfer agents." Although the precise mechanism by which they act as stabilisers is not yet fully understood they appear to function by accepting energy from chromophores in the polymer which have themselves already accepted energy from the incident ultraviolet radiation. This means that the chromophores, which would otherwise be responsible for the chemical reactions and associated degradative effects referred to above, are deactivated and the polymer is stabilised. The transfer of energy between the stabiliser and the chromophore, which takes place at an energy level of the stabiliser (frequently a triplet) close to and just below the energy level of the activated chromophore, may involve collision or may even occur over distances greater than the collision diameters, for example up to 50A or perhaps even greater. It can be seen from this that the energy transfer type of stabilisers protect by accepting or "quenching" the radiation energy absorbed by chromophores, whereas the absorber type of stabilisers protect by preventing the radiation energy from reaching the chromophores. Other excited species may be formed from UV excited chromophores. Energy transfer agents may operate by quenching or deactivating these secondary excited species as well as the directly excited chromophores.

When energy transfer agents are blended intimately with a polymeric substrate there can be similar disadvantages to those attendant upon the use of absorbers, namely lack of compatibility and adverse effects on the properties of the substrate.

We have found, in accordance with this invention, that articles comprising a polymeric substrate can be stabilised against the degradative effects of ultraviolet radiation by distributing through a continuous thin surface layer of the substrate an energy transfer agent which is a substituted phenol. Preferably, the polymeric substrate has a maximum thickness of about 50 microns and the amount of energy transfer agent in the substrate surface layer is at most 0.4% by weight based on the weight of the polymeric substrate.

The invention makes possible effective stabilisation at loadings of energy transfer agent, for example, as low as 0.001% by weight, on substrates as films or fibers having a thickness of 20μ.

Since energy transfer agents should be located close to the chromophores if they are to be effective (probably within about 50 A) and the important chromophores are present in a thin surface layer, it is not necessary to distribute the energy transfer agents throughout the cross section of the articles. The surface application of the stabiliser requires less material than does uniform distribution throughout the article, without an appreciable sacrifice in the stability of the article to ultraviolet radiation. In this connection it should be appreciated that the surface of the polymeric substrate to which the surface layer of the energy transfer agent is applied has numerous physical irregularities resulting from processing, and properly should be considered to be a layer of several hundred Angstroms thickness. This should be taken into account when reference is made in this specification to the application of the layer of stabiliser to the surface of a substrate.

The energy transfer agents which are used in accordance with the invention may be differentiated from ultraviolet absorbers by means of a relatively simple test, referred to hereinafter as the "screening test." This "screening test" is illustrated by the figure which shows samples arranged inside a carbon arc "Fade-Ometer" (Registered Trade Mark). Radiation from an arc A passes through a borosilicate glass globe B and falls on a first film D which is mounted in a metal frame C on a rotating drum F of the machine. The test measures the ability of an ultraviolet stabiliser, which has been incorporated in or on film D, to protect a second film E mounted directly behind film D from the radiation of arc A. Film E contains no ultraviolet stabiliser, and is mounted so as to receive only radiation which has passed through film D. The film E will usually degrade almost as rapidly (within 10-20%) behind a film D which has been stabilised with an energy transfer agent as it will when irradiated directly, that is without film D. Film E will, however, have a significantly reduced degradation rate if film D is protected with an ultraviolet absorber and will have a lifetime close to or slightly greater than that of Film D. An obvious prerequisite for this test is a high inherent transmission of the incident radiation by the unstabilised polymer films. Some energy transfer agents may show a small absorption of the ultraviolet radiation, which could contribute to the stabilisation effect but only when used at concentrations appreciably in excess of those required for adequate protection by the energy transfer mechanism.

The energy transfer agents used in accordance with this invention are substituted phenolic organic compounds.

Organic compounds which we have found to pass the stabiliser screening test described above, when blended with polypropylene, include 2-hydroxy-4-dodecyloxybenzophenone and octadecyl 3-(3',5'-di-tert-butyl-4'-hydroxyphenyl) propionate, and preferred compounds are of the general formula:

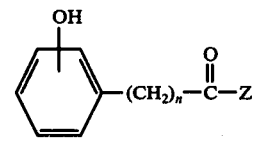

wherein $n$ is 0 or an integer from 1 to 6, and Z is a group —R or —OR wherein R is a hydrocarbyl group, or a derivative of such a compound in which the benzene ring is substituted by one or more hydroxyl, nitro, halogen, —R, or —OR substituents. These compounds preferably are used in an amount of from 0.03 to 0.4% by weight. Typical groups which can be represented by R are aryl, alkyl, aralkyl and alkenyl in which the alkyl or alkenyl moieties preferably have at most six carbon atoms.

Certain of the energy transfer agents also provide dye receptor sites. Under suitable conditions, the presence of the stabilisers on the surface facilitates very rapid dyeing to intense shades and requires less dye. Polyolefins, in particular, have proven difficult to dye, and the double-barrelled advantages of ultraviolet stabilisation and enhanced dyeability both provided by one surface additive have made this aspect of the invention particularly attractive. The articles which are stabilised in accordance with the invention preferably have a high ratio of surface area to volume, such as individual filaments, fibers or films having a thickness of up to about 50 microns as used, for example, in composite films, fibres, and woven or felted fabrics.

The energy transfer agent should be present at the surface of a substrate as a thin substantially continuous layer. The formation of this layer may be achieved in a number of ways. For example, the layer may be formed during fabrication of an article by:

1. conjugate extrusion of a thin, fully stabilised polymeric layer on the surface of an unstabilised or partially stabilised core which forms the substrate; or
2. adjustment of the melt properties and stabiliser mobility such that the stabiliser preferentially migrates to the surface during extrusion.

Alternatively, the stabiliser may be added to a preformed article by, for example:

3. deposition of the stabiliser, for example, by sublimation, as an extremely thin continuous layer which is in molecular contact with the surface of the article; or
4. diffusion of the stabiliser into the preformed articles from a solution, so that add-on is confined to the surface layer of the article.

In order to achieve a satisfactory bond between the substrate and the layer of energy transfer agent, it is preferred that the surface of the substrate should be activated (before or after deposition of the energy transfer agent) by a suitable treatment, for example, by exposure to an electrical discharge or by a flame or chemical treatment. Thus, for example, a stabiliser may be sublimed onto a substrate in the presence of a glow discharge, or the surface may be exposed to a corona discharge or treated chemically and the stabiliser then sublimed onto the treated surface. The methods (3) and (4) may be used for the application of stabilisers which cannot withstand the temperatures involved in extrusion, for example, about 250° C. This procedure can be used with advantage when the stabiliser is of low solubility or volatility.

The application of a stabiliser by method (3) may be effected by sublimation of the stabiliser (or suitable precursor) at low pressure (1–10 torr) onto the article. The techniques for the operation of continuous flow lines through reduced vacuum regions have been described in U.S. Pat. No. 3,179,482, and by W. R. R. Park in "Plastics Film Technology" Ch. 6, published by Van Nostrand Reinhold Co., New York (1969). The cost of the increased mechanisation required for the coating step may be partially offset by the absence of blending machinery required to produce a homogeneous distribution of the stabiliser in blended resins.

Loss of stabiliser by volatilisation, extraction or abrasion can result in loss of protection against ultraviolet degradation. Consequently the selection of coating techniques or specific stabilisers that will minimize this loss are preferred. The choice of stabilisers of low volatility can improve the retention of surface coatings of stabilisers.

The following Examples are provided to illustrate the invention. Examples 1 to 3 illustrate the vacuum deposition of a surface coating of an energy transfer agent, and Example 4 is a comparative Example illustrating vacuum deposition of a surface coating of conventional absorber stabilisers. In these Examples a surface layer of the stabiliser was deposited onto the relatively cool polymer substrate by sublimation. The apparatus utilised consisted of a metal drum which rotated above a boat containing the uniformly distributed stabiliser. The drum was mounted inside a bell jar which could be evacuated to the required reduced pressure. Film samples of the polymeric substrate were attached to the outside of the drum, and could be subjected to an electrical discharge treatment if required by an electrode situated diametrically opposite the additive boat. After evacuation of the bell jar, the drum was rotated continuously at 150 r.p.m. and the boat heated to a predetermined sublimation temperature. When required, the electrode was supplied with 0.5 MHz at about 25 KV from a high frequency generator. The apparatus is essentially the same as that described for the coating of metal cans by T. Williams and M. W. Hayes in Nature 216 (1967), page 614.

EXAMPLE 1

Under some conditions, the loss of stabiliser from an article by volatilisation or extraction may be important. Electrical discharge treatment can be utilised to improve the tenacity with which a coating is retained. In this Example, a commercial unstabilised polypropylene film was coated with 2-hydroxy-4-dodecyloxybenzophenone, accompanied by glow discharge treatment of the surface throughout the sublimation. The sublimation was efected at a temperature of 156° C. under a pressure of 1.0 torr. The total stabiliser loading was calculated from the weight increase of each film. The films were evaluated by ultraviolet exposure. Film lifetimes are expressed as hours of ultraviolet exposure in an Atlas Carbon-arc Fade-Ometer (at an ambient temperature of 35° C.) sufficient to cause brittle failure of the sample when flexed. Unstabilised films were exposed behind the coated films described above. A sgnificant degree of protection was observed with this coated stabiliser, as shown below:

Film A: 2-hydroxy-4-dodecyloxybenzophenone coated, 0.2% loading.
   Film failed at 505 hr.
Film B: untreated, unstabilised.
   Film failed at 90 hr.

EXAMPLE 2

A commercial unstabilised polypropylene film was coated with octadecyl 3-(3',5'-di-t-butyl-4'-hydroxyphenyl)propionate (commercially available under the trade mark Irganox 1076 from Geigy Chemical Corpn.) during a glow discharge treatment as described in Example 1. The sublimation temperature was 160° C. and the pressure was 1.0 torr. The coated films had an appreciable lifetime under ultraviolet irradiation when tested as in Example 1, in comparison with unstabilised films irradiated either directly or screened by the coated film sample. The results are shown in Table 2.

TABLE 2

| Stabiliser | Average Loading w% | Film Lifetime (hr.) |
|---|---|---|
| a) None | — | 90 |
| b) Irganox 1076 | 0.4 | 400 |
| c) None: screened by film (b) | — | 150 |

EXAMPLE 3

A 22 micron commercial unstabilised polypropylene film was coated on both surfaces with 2,4-di-tert-butylphenyl (4'-hydroxy-3',5'-di-tert-butyl benzoate) (phenol I). The sublimation temperature was 190° C. at a pressure of 1 torr. of nitrogen. The coating procedure and UV exposure were essentially as described in Example 1. The stabilizer concentration was determined by UV spectroscopy. The stabiliser also was hot pressed with polypropylene powder at 230° C. to give a 22 micron film with uniformly distributed stabiliser. An unstabilised film was exposed behind each irradiated film. The results are shown in Table 3.

TABLE 3

| Stabilizer Addition | Average Loading w% | Irradiated film lifetime (hr.) | Screened film lifetime (hr.) |
|---|---|---|---|
| None | — | 110 | 110 |
| Melt dispersed phenol I | 0.10 | 820 | 160 |
| Sublimed phenol I | 0.05 | 830 | 150 |

The surface coating of phenol I gave protection equivalent to that achieved with twice the concentration of phenol I dispersed uniformly throughout the film.

EXAMPLE 4

This Example illustrates the deficiencies of ultraviolet absorber as surface coatings. Surface coating of stabilisers belonging to the absorber class were applied by vacuum sublimation as described in Example 1. Unstabilised films (labelled "screened film") placed behind these coated samples had considerably longer lifetimes than directly irradiated, unstabilised control samples. One stabiliser was "Tinuvin 328" (trade mark by Geigy Chemical Corpn.), which is a substituted 2(2'-hydroxyphenyl)benzotriazole, and the other was p-(t-octyl)phenyl salicylate. Sublimation was carried out at a pressure of 1.0 torr. and at temperatures of 140° C. (Tinuvin 328) and 110° C. (salicylate). None of these coatings was significantly effective as a stabiliser, considering the high loadings as can be seen from Table 4. However, if merely doubling the film lifetime should be satisfactory for some purposes, then a comparison with the results in the other examples will show that this degree of stabilisation can be achieved according to the invention employing only one hundredth the amount of stabilizer.

TABLE 4

| Stabiliser | Average Loading w% | Coated Film Lifetime (hr.) | Screened Film Life-Time (hr.) |
|---|---|---|---|
| None | — | 95 | 95 |
| Tinuvin 328 | 0.5 | 210 | 200 |
| p-(t-octyl)phenyl salicylate | 1.0 | 210 | 120 |

Examples 5, 6, and 7, illustrate the addition of stabilisers by diffusion. Energy transfer stabilisers may be applied by brief exposure (1 hr. or less) of an unstabilised polypropylene film to a solution of the stabiliser. The treatment time preferably should be short to prevent extensive diffusion of the stabiliser into the polymer, with associated high consumption of the stabiliser.

EXAMPLE 5

Unstabilised commercial polypropylene films were immersed in a xylene solution of 2-hydroxy-4-dodecyloxybenzophenone (3.0 w%) for 1 hour at various temperatures. The treated films were then briefly rinsed in methanol (10 seconds) and rapidly dried by exposure to a warm air blast (30 seconds at 60° C.). The stability of these films was evaluated by exposure to the Carbon-arc Fade-Ometer described in Example 1. The lifetimes of the various films are listed in Table 5.

TABLE 5

| Diffusion Period (hr.) | Solution Temp. (° C) | Average Loading w% | Film Lifetime (hr.) |
|---|---|---|---|
| — | — | — | 95 |
| 1.0 | 25 | 0.05 | 245 |
| 1.0 | 40 | 0.06 | 290 |

EXAMPLE 6

Unstabilized 22 micron commercial polypropylene films were immersed in a xylene solution of 2,4-di-tert-butylphenyl(4'-hydroxy-3',5'-di-tert-butylbenzoate) (3.0 w%) at 25° C. for various intervals. The treated films were briefly rinsed in methanol and rapidly hot air dried. The film UV stability values and stabiliser loadings were determined as in Example 3. Results are shown in Table 6.

TABLE 6

| Diffusion Period (min) | Average Loading w% | Film Lifetime (hr.) |
|---|---|---|
| — | — | 110 |
| 5.0 | 0.1 | >1500 |
| 1.0 | 0.05 | 1200 |
| — | 0.1* | 820 |

*A uniform blend of 0.1 w% stabiliser, prepared by hot pressing at 230° C.

EXAMPLE 7

Since the surface concentration of the stabilisers may be depleted by exposure to solvents, a post treatment may be required to minimize this loss. This treatment can consist of a brief exposure of the stabilised sample to a corona discharge (that is an electrical discharge treatment carried out at atmospheric pressure) in a chemically inert gas, such as nitrogen, argon or helium. Unstabilised commercial polypropylene films were treated with a solution of 2-hydroxy-4-dodecyloxybenzophenone in xylene for 30 min. at 25° C. as described in Example 5. Some films were subsequently exposed to a nitrogen corona discharge treatment on both surfaces for 50 seconds. The stability of these films both before and after acetone extraction (15 hr. in a Soxhlet extractor) is compared in Table 7. Samples treated with a corona discharge showed no decrease in stability on acetone extraction, whereas the untreated film showed almost complete loss of stabiliser.

TABLE 7

| Diffusion Period (hr.) | Initial Average Loading w% | Corona Treatment | Acetone Extraction | Film Life-Time (hr.) |
|---|---|---|---|---|
| 0 | — | — | — | 94 |
| 0.5 | 0.03 | — | — | 180 |
| 0.5 | 0.03 | — | | 94 |
| 0.5 | 0.03 | | | 180 |

We claim:
1. Thin films, fibers, and filaments of polymeric material having high surface area in relation to volume stabilized against the degradative effects of actinic radiation, comprising said polymeric material containing an energy transfer agent which is incorporated into a thin surface layer having a thickness of not more than 1 micron, said energy transfer agent being a substituted phenol of the formula:

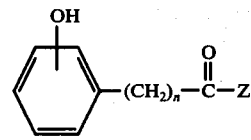

wherein $n$ is 0 or an integer from 1 to 6, and Z is a group —R or —OR wherein R is a hydrocarbyl group, or a derivative of such a substituted phenol in which the benzene ring is substituted by one or more hydroxyl, nitro, halogen, —R or —OR substituents wherein R is a hydrocarbyl group, the amount of energy transfer agent in the layer being at most 0.4% by weight based on the weight of the polymeric material, said energy transfer agent being differentiated from an ultraviolet absorber by a screening test which comprises (i) depositing the energy transfer agent onto a first thin film of a polymeric material in a stabilizing amount, said material having a high inherent transmission of incident ultraviolet radiation in the absence of any ultra-violet stabilizer, (ii) positioning a second film of said polymeric material containing no stabilizer so as to receive only radiation which has passed through said first film; (iii) irradiating said first film which has said agent deposited thereon with ultra-violet light, and (iv) determining the extent of degradation of said second film, said second film being degraded almost as rapidly when an energy transfer agent has been deposited on said first film as when irradiated in the absence of said film, this not being the case when said first film is stabilized with an ultra-violet absorber.

2. Thin films, fibers, and filaments as defined in claim 1, wherein the energy transfer agent is 2,4-di-tert-butylphenyl(4'-hydroxy-3',5'-di-tert-butylbenzoate).

3. Thin films, fibers, and filaments as defined in claim 1, having a thickness of up to about 50 microns.

4. Thin films, fibers, and filaments as defined in claim 1, wherein the polymeric material is formed of a polyolefin.

5. Thin films, fibers, and filaments as defined in claim 1, wherein the polymeric material is formed of polypropylene.

6. Thin films, fibers, and filaments as defined in claim 1, wherein the energy transfer agent is distributed through the thin surface layer.

7. Thin films, fibers, and filaments as defined in claim 1, wherein the energy transfer agent is deposited upon the polymeric material to form said continuous thin surface layer.

8. A process for preparing thin films, fibers and filaments of polymeric material as claimed in claim 1, which process comprises depositing a thin continuous layer on the surface of said polymeric material, said layer being not more than 1 micron thick, and containing an energy transfer agent which is a substituted phenol as defined in claim 1, the amount of energy transfer agent in the layer being at most 0.4% by weight based on the weight of the polymeric material.

9. A process as defined in claim 8, wherein the surface of the polymeric material is activated by exposure to an electrical discharge before or after the energy transfer agent is deposited thereon.

10. A process as defined in claim 8, wherein the thin continuous layer is deposited on the surface of the polymeric material by immersing the material in a solution of the energy transfer agent.

11. A process as defined in claim 8, wherein said polymeric material has a maximum thickness of about 50 microns.

12. A process for preparing thin films, fibers and filaments of polymeric material as claimed in claim 1, which process comprises incorporating into sustantially only a continuous thin surface layer of said polymeric material in energy transfer agent which is a substituted phenol as defined in claim 1, said layers being not more than 1 micron thick the amount of energy transfer agent in the layer being at most 0.4% by weight based on the weight of the polymeric material.

13. A process as defined in claim 12, wherein the energy transfer agent is 2,4-di-tert-butylphenyl (4'-hydroxy-3',5'-di-tert-butylbenzoate).

14. A process as defined in claim 12, wherein said thin film, fibers, and filaments have a maximum thickness of about 50 microns.

15. A process as defined in claim 12, wherein the surface of the polymeric material is treated by exposure to a corona discharge after the energy transfer agent has been incorporated therein.

16. An article stabilized against the degradative effects of actinic radiation, which comprises a polymeric substrate having a maximum thickness of about 50 microns and having incorporated into substantially only a continuous thin surface layer thereof an energy transfer agent which is a substituted phenol of the formula:

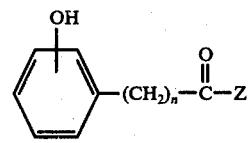

wherein $n$ is 0 or an integer from 1 to 6, and Z is a group —R or —OR wherein R is a hydrocarbyl group, or a derivative of such a substituted phenol in which the benzene ring is substituted by one or more hydroxyl, nitro, halogen, —R or —OR substituents wherein R is a hydrocarbyl group, said layer being not more than 1 micron thick, the amount of energy transfer agent in the layer being at most 0.4% by weight based on the weight of the polymeric substrate, said energy transfer agent being differentiated from an ultra-violet absorber by a screening test which comprises (i) depositing the energy transfer agent onto a first thin film of a polymeric material in a stabilizing amount, said material having a high inherent transmission of incident ultra-violet radiation in the absence of any ultra-violet stabilizer, (ii) positioning a second film of said polymeric material containing no stabilizer so as to receive only radiation which has passed through said first film; (iii) irradiating said first film which has said agent deposited thereon with ultra-violet light, and (iv) determining the extent of degradation of said second film, said second film being degraded almost as rapidly when an energy transfer agent has been deposited on said first film as when irradiated in the absence of said first film, this not being the case when said first film is stabilized with an ultra-violet absorber.

17. An article as defined in claim 16, wherein the amount of energy transfer agent in the layer is of the order of about 0.03 to 0.06% by weight.

18. An article as defined in claim 16, wherein the amount of energy transfer agent in the layer is of the order of about 0.1% by weight.

19. An article as defined in claim 16, wherein the amount of energy transfer agent in the layer is of the order of about 0.03% by weight.

20. An article as defined in claim 16, wherein the amount of energy transfer agent in the layer is of the order of about 0.05% by weight.

21. An article as defined in claim 16, wherein the amount of energy transfer agent in the layer is of the order of about 0.06% by weight.

* * * * *